United States Patent [19]

De Castro Basto

[11] 4,112,592
[45] Sep. 12, 1978

[54] APPARATUS FOR TEACHING OR PRACTISING BRIDGE

[76] Inventor: Arthur Jose De Castro Basto, Las Torres II, 3°B, Los Boliches Fuengirola, Spain

[21] Appl. No.: 774,400

[22] Filed: Mar. 4, 1977

[30] Foreign Application Priority Data

Mar. 12, 1976 [GB] United Kingdom .......... 9970/76

[51] Int. Cl.² .............................................. G09B 19/22
[52] U.S. Cl. .............................................. 35/8 B; 35/75
[58] Field of Search ............... 35/8 B, 9 E, 9 F, 75; 273/148 R, 148 A, 150, 151

[56] References Cited

U.S. PATENT DOCUMENTS

| 1,641,982 | 9/1927 | McDade | 35/9 E X |
| 2,025,966 | 12/1935 | Williams | 35/8 B |
| 3,013,349 | 12/1961 | Cooper | 35/8 B X |
| 3,152,403 | 10/1964 | Betz | 35/9 F |

Primary Examiner—William H. Grieb
Attorney, Agent, or Firm—Brisebois & Kruger

[57] ABSTRACT

An apparatus for teaching bridge comprises a first sheet bearing a representation of a bridge hand and a second sheet associated with the first sheet bearing information relating to one way of bidding the hand represented on the first sheet in a given situation. The first sheet is so formed that the second sheet can be moved relative to the first sheet progressively to reveal different parts of the information on the second sheet. A student using the apparatus is presented with a bridge hand and informed of the circumstances in which he is holding the hand; he is then required to make bids in response to bidding from other imaginary players and after making such a bid moves the second sheet relative to the first to reveal the bid which he should have made and comments on why he should have made that bid. The student then considers his next bid in response to the further bids of the other imaginary players and then again moves the second sheet relative to the first. This operation is repeated until the end of the bidding. A plurality of first and second sheets are provided to enable a student to repeat this procedure with many other hands.

7 Claims, 4 Drawing Figures

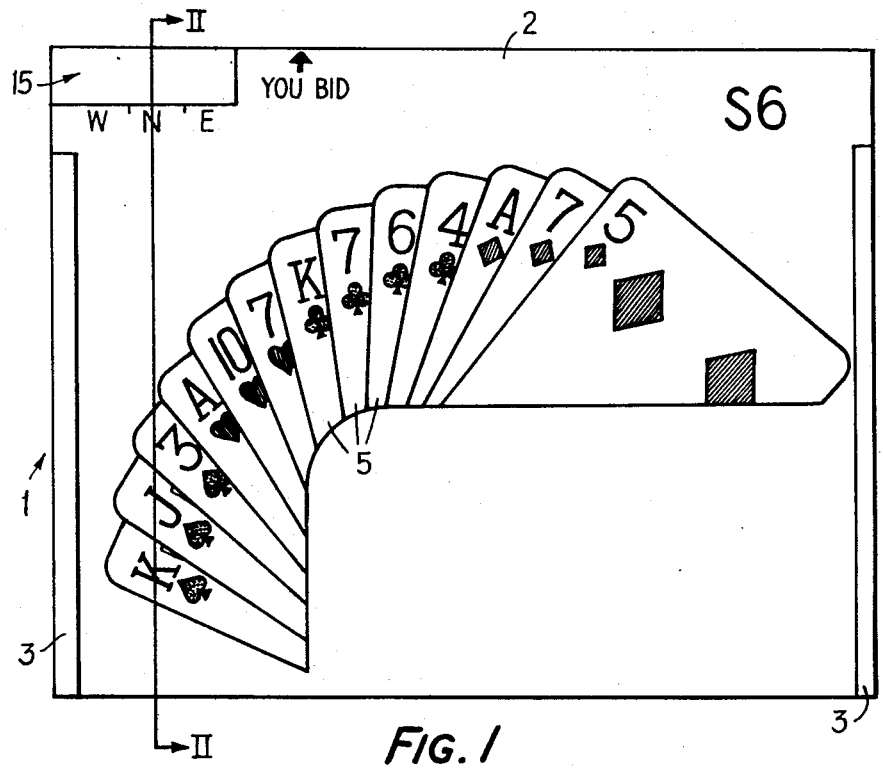

APPARATUS FOR TEACHING OR PRACTISING BRIDGE

The present invention relates to apparatus for teaching or practising bridge. The invention is particularly directed to apparatus for teaching a system of bidding.

Appliances have been proposed for the teaching and study of bridge. These appliances have permitted a student to bid in response to bids by his partner and opponents in an imaginary game of bridge. However, such appliances have suffered from the disadvantage that they require a separate book to explain why a certain bid should be made. Another disadvantage of such appliances is that due to their cost and their method of presentation, very few imaginary games of bridge can be supplied, so that a student has only a very limited number of bidding situations from which to learn. A large number of books have also been written instructing a student on bidding; these books suffer from the disadvantage that information concerning the bids of the other players and the cards held by the other players cannot be selectively concealed by the student and then revealed at an appropriate time such as after he has had an opportunity of making his bid.

It is an object of the invention to provide an improved apparatus for teaching or practising bridge.

According to the invention there is provided an apparatus for teaching bridge comprising a first sheet bearing a representation of a bridge hand, and a second sheet associated with the first sheet bearing information relating to one way of bidding the hand represented on the first sheet in a given situation, wherein the first sheet is so formed that the second sheet can be moved relative to the first sheet progressively to reveal different parts of the information on the second sheet.

The given situation can be indicated on the second sheet and can include information about the partnering hands and opposing hands. Such information can indicate the vulnerability of either pair of hands and the imaginary dealer of the hands. A student using the apparatus is therefore able to make a particular bid for the given situation when holding the hand represented. Having made a bid he is able to move the second sheet relative to the first sheet to reveal on the second sheet what bid he should have made and also the bids of the other hands (if any) in the next round of bidding. He is then able to make another bid and move the second sheet to reveal further information. This process can be repeated until all the information on the second sheet is revealed. The second sheet can also include comments on various bids that might have been made and on the play of the hand after the bidding.

The apparatus can include a plurality of second sheets, each second sheet bearing information relating to a way of bidding the hand in a respective given situation and each first sheet can be formed to enable any particular second sheet to be moved relatively to the first sheet progressively to reveal different parts of the information on the particular second sheet. The provision of a plurality of second sheets enables a student to make bids when partnering different hands in various states of vulnerability and with different imaginary dealers and following different intervening bids by the opponents.

A plurality of first sheets can be provided. In this case a student can make bids when having various different hands.

First and second sets of first sheets can be provided, each first sheet of the first set representing a bridge hand whose playing cards are selected from a first predetermined group of cards and each first sheet of the second set representing a bridge hand whose playing cards are selected from a second predetermined group of cards, the first and second groups of cards being mutually exclusive. The first group of playing cards can consist of twenty six cards, and the second group of playing cards can consist of the other twenty six cards of an ordinary pack of playing cards.

Each second sheet associated with a first sheet of the first set can bear information relating to one respective way of bidding the hand represented on the associated first sheet in a given situation and when the hand is in partnership with a particular hand represented on a first sheet of the second set. Similarly, each second sheet associated with a first sheet of the second set can bear information relating to one respective way of bidding the hand represented on the associated first sheet when the hand is in partnership with a particular hand represented on a first sheet of the first set in a given situation. In this case a student after making the bidding of his hand, being a hand represented on a first sheet of one set, can study both his hand and his partner's hand, being a hand represented on a first sheet of the other set.

The representation can be a pictorial reproduction of a bridge hand; alternatively the hand can be represented by symbols each of which is a well known symbol for a card.

Each first sheet can be provided with a pocket to receive associated second sheets.

Each first sheet can bear a representation of a respective bridge hand on opposite exterior faces of the sheet, in which case the pocket can be formed between the opposite exterior faces of the sheet.

The or each face of each first sheet can be provided with a cut out portion through which part of a second sheet is visible.

One form of apparatus for teaching bridge and constructed in accordance with the invention will now be described, by way of example, with reference to the accompanying drawings, in which:

FIG. 1 is a plan view of a first part of the apparatus;

FIG. 3 is a plan view of a second part of the apparatus; and

Figure 2:
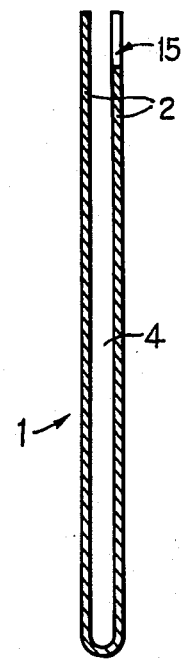
FIG. 2 is a cross-section on the line II—II of FIG. 1.

FIGS. 1 and 2 show a folder 1 made up of a piece of card folded in half to form two rectangular sheets 2, each measuring 160 mm × 125 mm. The sides of the folder 1 so formed are fixed together by lengths of adhesive tape 3 to form a pocket 4 therebetween. On both exterior faces of the folder 1 a respective bridge hand comprising characteristic parts 5 of thirteen playing cards is depicted by printing on each face a pictorial reproduction of a bridge hand when spread fanwise, as in the ordinary game. It should be understood that the apparatus depicted in the drawings is adapted for use in Great Britain and the indicia shown are therefore those suitable for Great Britain. The indicia can of course be modified to corresponding indicia recognized in other countries. The top left hand corner of each face (as viewed from in front of the respective face) is cut away to define a rectangular cut out 15 measuring 35 mm × 10 mm.

The apparatus includes twelve folders altogether, made up of two groups of six folders. The group to which each folder belongs is identified by the colour of the folder, for example blue for one group and white for the other group, and also by the letter 'S' or 'N' at the top right hand corner of both exterior faces of the folder. Each hand depicted on a folder of one group is specifically identified by a number between 1 and 12 which follows the letter 'S' or 'N'. The letters 'S' and 'N' stand for 'South' and 'North' respectively; these terms are well known to bridge players and represent partnering players in a game of bridge, East and West being the opposing players. Thus the pockets have depictions of 24 hands labelled 'S1' to 'S12' and 'N1' to 'N12'.

All the South hands are made up of cards selected from a predetermined group of 26 cards and all the North hands are made up of cards selected from the remaining group of 26 cards. Thus it is assured that the cards in any South hand are all different from the cards in any North hand.

Immediately below the cut out the letters 'W', 'N' and 'E' are marked (as shown in FIG. 1); these letters stand for West, North and East respectively and their purpose will be described later. Immediately to the right of the cut out are the indicia 'YOU BID', and an upwardly directed arrow the purpose of which will also be described later. The folder shown in the drawings is a South folder; on the North folders the letters 'W', 'N' and 'E' are replaced by 'E', 'S' and 'W' respectively.

The pocket 4 in FIGS. 1 and 2 is shown empty. However in normal use the folder 1 includes 12 double sided instruction sheets such as the sheet 6 shown in FIG. 3. The other side of sheet 6 is of similar layout and construction, although the particular indicia are different. The layout of the sheet 6 will now be described in general terms with the particular indicia appearing on the sheet of FIG. 3 shown in parentheses.

Each sheet 6 measures 157 mm × 110 mm. In the top right hand corner (in phantom box 7) the hand to which the sheet relates and the folder 1 into which it should be placed is marked ('S 6'). In the top left hand corner (in phantom box 8) the partnering hand is marked (N 8). In the phantom box 9, at the top centre of the sheet, further information is given such as the type of bidding system used (Natural), the imaginery dealer (West), and the vulnerability of the hands (NS vuln). Below this information there are a series of rows 10, 11 each of which relates to a round of imaginary bidding, each round ending with a bid of the hand depicted on the pocket (South). The imaginary bids of the partnering hand (North) and opposing hands (East, West) are each shown in a respective column 12 (West), 13 (North) and 14 (East). The columns 12, 13 and 14 are aligned respectively with the letters W, N and E under the cut out 15 in the pocket 4, when the instruction sheet is inserted in the pocket; in this way an operator can immediately see which bid is associated with which imaginary player. To the right of the bids, the correct bid of the hand depicted on the pocket is shown together with comments on the bid. For example on the sheet of FIG. 3 the first correct bid is "3 No Trumps" and the comments are: "You haven't a 4-card suit except clubs, but with your 15 points a game is assured even with your single stopper in hearts. Also partner could have the Jack or Queen." The second correct bid is "Pass" and the comments are "North has picked his suit so you must abide by his decision." Any "No-bid" by a hand is shown by a dash in the space reserved for the particular bid.

The other side of sheet 6 refers to the same partnering hands but to a different initial situation so that the information in the phantom box 9 is different. The other side of the sheet 6 is conveniently distinguised by marking the hand to which the sheet relates and the partnering hands as S6a and N8a respectively.

The operation of the apparatus will now be described with reference to the particular example shown in the drawings. A student first selects a particular hand depicted on a folder and a particular instruction sheet 6 associated with that hand; the other sheets associated with the hand may be stored in the pocket 4 as described or elsewhere. Assuming the student has selected the folder 1 and sheet 6 shown in the drawings, he then arranges the sheet 6 immediately behind the front face of the folder and pulls the sheet 6 out of the folder 1 until the information in the phantom boxes 7, 8 and 9 is revealed. The student infers from this information that he is playing an imaginery game of bridge, having the hand shown on the front face of the folder 1, being partnered by the hand 'N8' (which he should not reveal at this stage) using a natural system of bidding, North and South being vulnerable and West being the dealer.

The action of pulling out the sheet as described also reveals columns 12, 13 and 14 of the first line of row 10. This tells the student the first round of bidding leading up to his bid; as previously described the sheet and pocket are so dimensioned that the bids in columns 12, 13 and 14 are aligned with the letters 'W', 'N' and 'E' respectively so that the student knows which imaginary player has made which bid.

Figure 4:
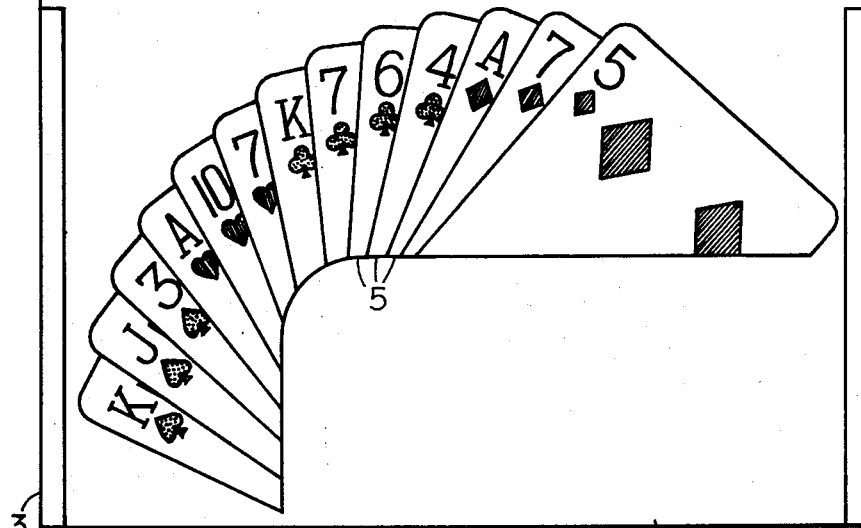
FIG. 4 is a plan view of the first and second parts of the apparatus in use.

Also the indicia 'YOU BID' on the folder 1 remind the student that his bid is to be made after the bid shown above the indicia 'E'. In the case shown West has bid three hearts, North has doubled and East has passed. The student then makes the bid that he thinks he should make in this particular situation and then pulls the instruction sheet 6 out of the folder 1 until the next row of bidding is revealed. This position is shown in FIG. 4. The student is then able to see what bid he should have made and to read the comments on the bid. Having read the comments the student can look at the cut out corner to see the next round of bidding and repeat the steps described above. This process is repeated until the conclusion of the bidding. After the bidding the student can look at his imaginary partner's hand 'N 8' referenced in the top left hand corner of the instruction sheet 6 and thus obtain a clear idea of why his partner bid as he did. At the bottom of the instruction sheet comments can be provided about the playing of the hand after the bidding.

A student can repeat the operation described above, holding the same hand, with the other side of the instruction sheet. The student can in turn repeat these operations with each of the eleven other instruction sheets. Each instruction sheet will refer him to a different North hand. The student can also repeat the operation himself holding each of the other eleven South hands. Furthermore the student can repeat these combinations with he himself holding the North hands and having South as an imaginary partner; in this case he reads the instruction sheets associated with the North hands and these sheets can give different information in the phantom boxes 7, 8 and 9 so that although the same hands are being used a different bidding situation results. Thus in the apparatus above using twelve pockets, 288 different arrangements of hands and 576 bidding sequences are available to a student.

As will now be apparent each folder 1 has a respective set of instruction sheets 6 for each of the hands depicted on the folder and there are a set of North folders and a set of South folders.

The various folders and instruction sheets can be distinguised by making them of different colours and using different colours of print.

In the particular example of the invention illustrated the group of North hands are made up from the following 26 cards:

Spades : Ace, Queen, 8, 7, 4, 2
Hearts : King, Jack, 9, 8, 6, 3, 2
Diamonds : King, Queen, Jack, Ten, 9, 4, 3
Clubs : Jack, Ten, 9, 5, 3, 2

The group of South hands are made up from the other 26 cards namely:

Spades: King, Jack, 10, 9, 6, 5, 3
Hearts: Ace, Queen, 10, 7, 5, 4
Diamonds: Ace, 8, 7, 6, 5, 2
Clubs: Ace, King, Queen, 8, 7, 6, 4

The apparatus described above makes available a large number of bridge hands which can be bid in the same manner as in a real game with intervening bids by a partner and opponents but without foreknowledge of the bids which will be made until they are made in the normal sequence of bidding.

Although one particular embodiment of the invention has been described by way of example, there are many alternative forms some of which will now be mentioned.

Instead of fixing the sides of the folder with adhesive tape, one of the sheets 2 at each side of the folder may be provided with a respective tab which can be folded over and stuck to the other of the sheets 2 to thereby fix the sides of the folder.

The two groups of hands can be distinguished by printing the indicia on the faces of the folders in two respective colours rather than using different colours for the folders. Alternatively the South folders may be distinguised by printing "SSSS..." along the borders of the South folders and "NNNN..." along the borders of the North folders, only the top borders of each folder not being printed.

The hand on each folder can be depicted by any convenient means; for example the cards can be shown symbolically by writing their conventional symbols on the face of the folder.

In the example described above there are two instruction sheets for each combination of pairs of North-South hands. However any number of sheets can be provided for each combination; each of the sheets can relate to a different bidding situation arising from a different dealer, different vulnerabilities or a different bidding system. Also the same groups of folders can be used for teaching various different bidding systems, the instruction sheets being changed.

The choice of two groups of six folders is only exemplary. Any number of folders can be used, for example two groups of three folders. However, the provision of the same number of folders in each group gives the maximum number of combination of hands for a given number of folders.

What is claimed is:

1. An apparatus for teaching bridge comprising:
    a first set of first sheets, each bearing a representation of the cards of a bridge hand, the cards being selected from a first predetermined group of cards;
    a second set of first sheets, each bearing a representation of the cards of a bridge hand, the cards being selected from a second predetermined group of cards, the two groups of cards being mutually exclusive;
    a first multiplicity of second sheets, each associated with a first sheet of the first set, each bearing information relating to one way of bidding the hand represented on its associated first sheet in a given situation and when the hand is in partnership with a hand represented on a first sheet of the second set, and each being moveable relative to its associated first sheet to reveal progressively different parts of the information on the second sheet; and
    a second multiplicity of second sheets, each associated with a first sheet of the second set, each bearing information relating to one way of bidding the hand represented on its associated first sheet in a given situation and when the hand is in partnership with a hand represented on a first sheet of the first set, and each being moveable relative to its associated first sheet to reveal progressively different parts of the information on the second sheet.

2. An apparatus as claimed in claim 1 in which the first group of playing cards consists of twenty six cards, and the second group of playing cards consists of the other twenty six cards of an ordinary pack of playing cards.

3. An apparatus as claimed in claim 1 in which each first sheet is provided with a pocket to receive associated second sheets.

4. An apparatus as claimed in claim 3 in which each first sheet bears a representation of the cards of a respective bridge hand on opposite exterior faces of the sheet, the pocket being formed between the opposite exterior faces of the sheet.

5. An apparatus as claimed in claim 1 in which each face of each first sheet bearing a representation of a bridge hand is provided with a cut out portion through which part of a second sheet is visible.

6. An apparatus for teaching bridge comprising:
    a first set of first sheets, each bearing a picture of the cards of a bridge hand, the cards being selected from a first predetermined group of cards;
    a second set of first sheets, each bearing a picture of the cards of a bridge hand, the cards being selected from a second predetermined group of cards, the two groups of cards being mutually exclusive;
    a first multiplicity of second sheets, each associated with a first sheet of the first set, each showing a sequence of bidding including bids of the hand pictured on its associated first sheet in a given situation and when the hand is in partnership with a hand represented on a first sheet of the second set, each bearing comments on the bids of the hand pictured on its associated first sheet, and each being moveable relative to its associated first sheet to reveal progressively the sequence of bidding and the comments; and
    a second multiplicity of second sheets, each associated with a first sheet of the second set, each showing a sequence of bidding including bids of the hand pictured on its associated first sheet in a given situation and when the hand is in partnership with a hand represented on a first sheet of the first set, each bearing comments on the bids of the hand pictured on its associated first sheet, and each being moveable relative to its associated first sheet to reveal progressively the sequence of bidding and the comments.

7. An apparatus as claimed in claim 6 in which each first sheet is provided with a pocket to receive associated second sheets.

* * * * *